United States Patent
De Meutter

(10) Patent No.: US 11,306,215 B2
(45) Date of Patent: Apr. 19, 2022

(54) UV CURABLE INKJET INKS

(71) Applicant: AGFA NV, Mortsel (BE)

(72) Inventor: Stefaan De Meutter, Mortsel (BE)

(73) Assignee: AGFA NV, Mortsel (BE)

( * ) Notice: Subject to any disclaimer, the term of this patent is extended or adjusted under 35 U.S.C. 154(b) by 54 days.

(21) Appl. No.: 16/086,359

(22) PCT Filed: Mar. 20, 2017

(86) PCT No.: PCT/EP2017/056541
§ 371 (c)(1),
(2) Date: Sep. 19, 2018

(87) PCT Pub. No.: WO2017/162579
PCT Pub. Date: Sep. 28, 2017

(65) Prior Publication Data
US 2019/0085190 A1  Mar. 21, 2019

(30) Foreign Application Priority Data

Mar. 21, 2016 (EP) .................................. 16161328

(51) Int. Cl.
| | | |
|---|---|---|
| *C09D 11/101* | (2014.01) | |
| *C09D 11/322* | (2014.01) | |
| *C09D 11/40* | (2014.01) | |
| *C09D 11/38* | (2014.01) | |
| *C09D 11/324* | (2014.01) | |

(52) U.S. Cl.
CPC .......... *C09D 11/101* (2013.01); *C09D 11/322* (2013.01); *C09D 11/38* (2013.01); *C09D 11/40* (2013.01); *C09D 11/324* (2013.01)

(58) Field of Classification Search
CPC ....... C09D 11/101; C09D 11/38; C09D 11/40; C09D 11/322; C09D 11/324
See application file for complete search history.

(56) References Cited

U.S. PATENT DOCUMENTS

| | | | |
|---|---|---|---|
| 2004/0024078 A1 | 2/2004 | Itoh et al. | |
| 2007/0139502 A1* | 6/2007 | Held | C09D 4/00 |
| | | | 347/100 |
| 2008/0018725 A1* | 1/2008 | Mogi | C09D 11/101 |
| | | | 347/102 |

FOREIGN PATENT DOCUMENTS

| | | |
|---|---|---|
| EP | 1 456 307 B1 | 12/2011 |
| EP | 2 399 965 A1 | 12/2011 |
| EP | 2 703 455 A1 | 3/2014 |

OTHER PUBLICATIONS

Official Communication issued in International Patent Application No. PCT/EP2017/056541, dated May 11, 2017.

* cited by examiner

*Primary Examiner* — Jessica M Roswell
(74) *Attorney, Agent, or Firm* — Leydig, Voit & Mayer, Ltd.

(57) ABSTRACT

A liquid UV curable inkjet ink includes one or more photoinitiators, an organic colour pigment, and a polymerizable composition containing at least one monofunctional polymerizable compound and at least one polyfunctional polymerizable compound, wherein the organic colour pigment is present in an amount of 6.0 to 13.0 wt % based on the total weight of the liquid UV curable inkjet ink; the at least one polyfunctional polymerizable compound is present in an amount of at least 20.0 wt % based on the total weight of the polymerizable composition; and the UV curable inkjet ink has a viscosity at 45° C. and a shear rate of 10 s−1 of at least 16.0 mPa.s.

15 Claims, 2 Drawing Sheets

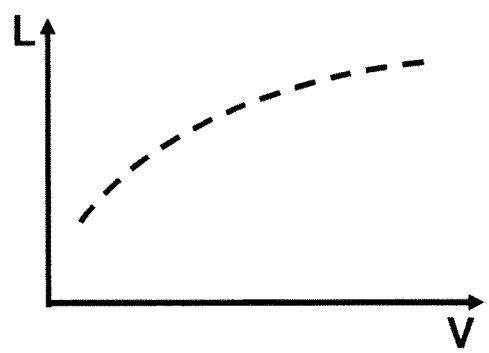
Fig. 3.a
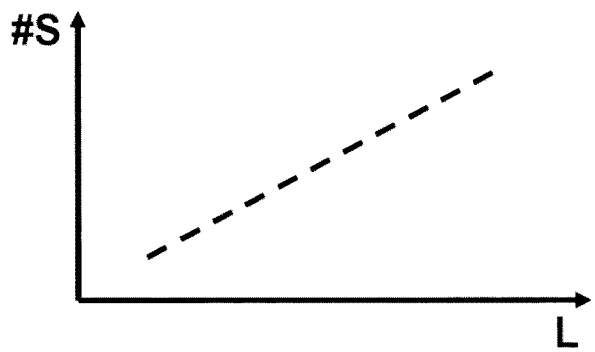
Fig. 3.b
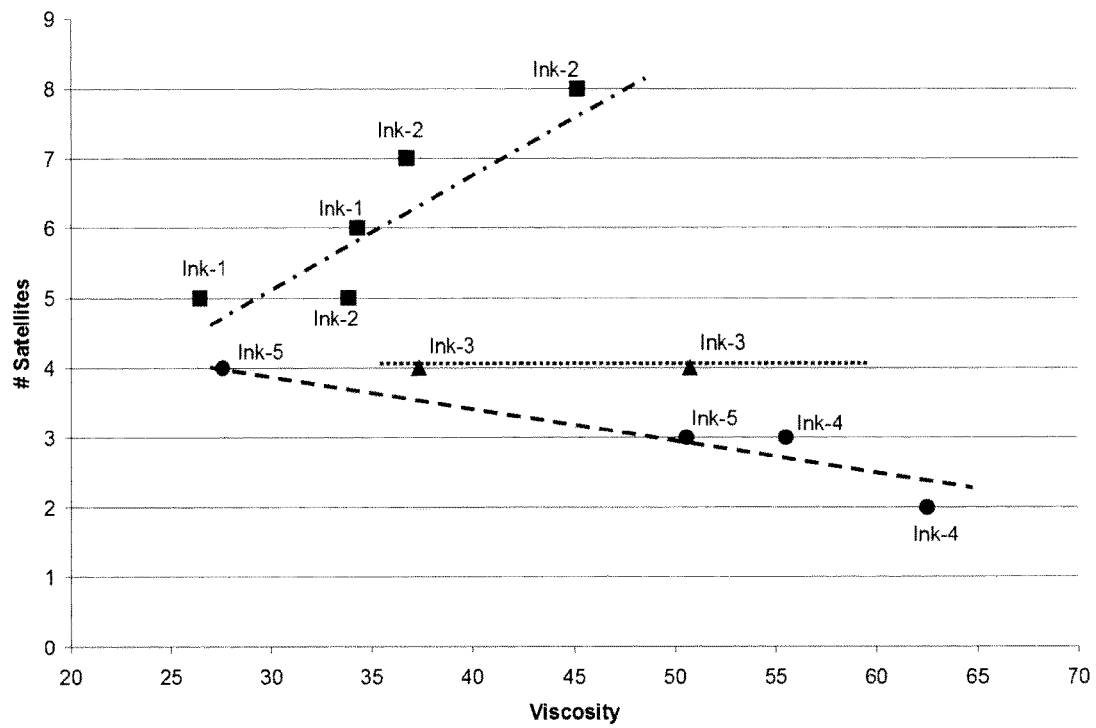
Fig. 4
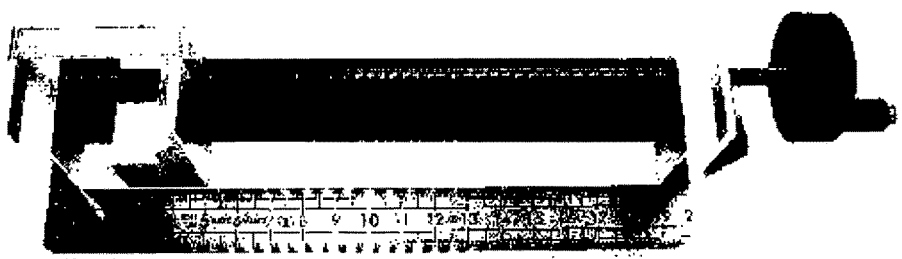
Fig.5

UV CURABLE INKJET INKS

CROSS REFERENCE TO RELATED APPLICATIONS

This application is a 371 National Stage Application of PCT/EP2017/056541, filed Mar. 20, 2017. This application claims the benefit of European Application No. 16161328.6, filed Mar. 21, 2016, which is incorporated by reference herein in its entirety.

BACKGROUND OF THE INVENTION

1. Field of the Invention

The present invention relates to UV curable inkjet inks for multi-colour inkjet printing methods.

2. Description of the Related Art

Industrial inkjet printing systems are increasingly replacing analogue printing systems, like offset and flexography, because of their flexibility in use and variable data printing capability. UV curable inkjet inks are particularly preferred because high quality colour images can be printed on non-absorbing ink-receivers, such as plastic or metal. For many applications, colour images printed on such non-absorbing ink-receivers should exhibit a high scratch resistance. Usually this is obtained by applying thick, highly cross-linked ink layers. Mostly this functions well for metal ink-receivers; however for plastic substrates in addition to scratch resistance often also a sufficient flexibility is required.

One approach is to find an optimal balance between monofunctional and polyfunctional polymerizable compounds, as exemplified by EP 2399965 A (AGFA)). Monofunctional monomers generally increase the flexibility, while polyfunctional monomers increase scratch resistance. However, scratch resistance and flexibility of an ink layer stand in a direct relation as shown by FIG. 1, where an increase in scratch resistance S results in a decrease of flexibility F and vice versa. For some applications, the attainable compromise in scratch resistance and flexibility remains insufficient.

A second approach is to replace part of the monomers in the inkjet ink by one or more reactive specific prepolymers or polymers. For example, US 2004024078 (SEIREN) discloses UV curable inkjet inks including a colouring component, a reactive oligomer and/or a reactive prepolymer, a reactive diluent and a photoinitiator, wherein a polymer of the reactive oligomer and/or reactive prepolymer and a polymer of the reactive diluent have a glass transition point of 0° C. to 70° C. The cured film of such an ink exhibited good flexibility, scratch resistance and adhesion. The ink compositions have a rather high viscosity of 60 to 800 mPa·s at 25° C., thus requiring high jetting temperatures of 60° or more.

The viscosity of UV curable colour inkjet inks is controlled by selecting appropriate low-viscosity monomers and oligomers. As viscosity tends to increase somewhat with the pigment concentration, UV curable colour inkjet inks in the market generally contain 1 to 5 wt % of an organic colour pigment based on the total weight of the inkjet ink. UV curable white inkjet inks generally contain a much higher concentration of an inorganic pigment, usually at least 15 wt % of titanium dioxide, in order to obtain a very opaque white layer. A slightly higher viscosity is tolerated for a white inkjet ink as it slows down the sedimentation of the white pigment which has a larger density and is also present in the inkjet ink at larger average particle sizes for obtaining good opaqueness.

An alternative inkjet technology employs so-called hot melt or phase change inkjet inks that are solid at room temperature and after melting are jetted at high jetting temperatures of 80° C. to 140° C. for obtaining a jetting viscosity of about 13 mPa·s. Such a UV curable phase change inkjet ink is disclosed e.g. by EP 1456307 A (3D SYSTEMS)). A disadvantage of jetting at very high temperatures is that the number of suitable ink-receivers becomes limited to non-thermosensitive substrates and that the energy consumption of the inkjet printing device increases drastically for melting the inkjet ink.

There still remains a need for UV curable inkjet inks exhibiting good flexibility and scratch resistance, while maintaining high cure speed and reliability necessary for an economical industrial inkjet printing process.

SUMMARY OF THE INVENTION

In order to overcome the problems described above, preferred embodiments of the present invention have been realized with liquid UV curable inkjet inks as defined below.

Preferred embodiments of the invention have also been realised with a UV curable inkjet printing method as defined below.

It was surprisingly found that a better compromise in scratch resistance and flexibility was obtained by increasing the viscosity at jetting to 16.0 mPa·s or more, increasing the organic pigment concentration between 6.5 wt % and 13.0 wt % in the UV curable inkjet ink, and controlling the amount of polyfunctional polymerizable compounds to a certain range. These measures lead to thinner ink layers having also an improved touch and feel on e.g. plastics and textiles.

The person skilled in the art of inkjet printing has always avoided printing at higher viscosities, since printing reliability is reduced by the increasing number of satellites (see FIGS. 3a and 3b). However, if both jetting viscosity and pigment concentration are controlled to values as prescribed in our invention, the number of satellites surprisingly even decreases with increasing jetting viscosity (see FIG. 4).

Further advantages and preferred embodiments of the present invention will become apparent from the following description.

BRIEF DESCRIPTION OF THE DRAWINGS

FIG. 3.a shows the general relation between the tail length L of an ejected droplet and the jetting viscosity V, while FIG. 3.b shows the number of satellites #S as a function of the tail length L.

FIG. 4 is a graph of the results of Example 2 depicting the number of satellites #S as a function of viscosity and inkjet inks having different pigment concentration.

FIG. 5 is a photograph of an apparatus for determining flexibility.

DETAILED DESCRIPTION OF THE PREFERRED EMBODIMENTS

Definitions

Figure 1:
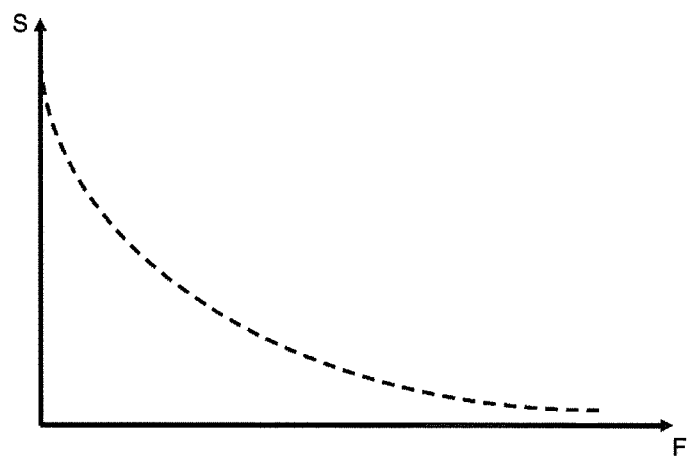
FIG. 1 shows the relation between the scratch resistance S and the flexibility F of a UV curable inkjet ink layer.
Figure 2:
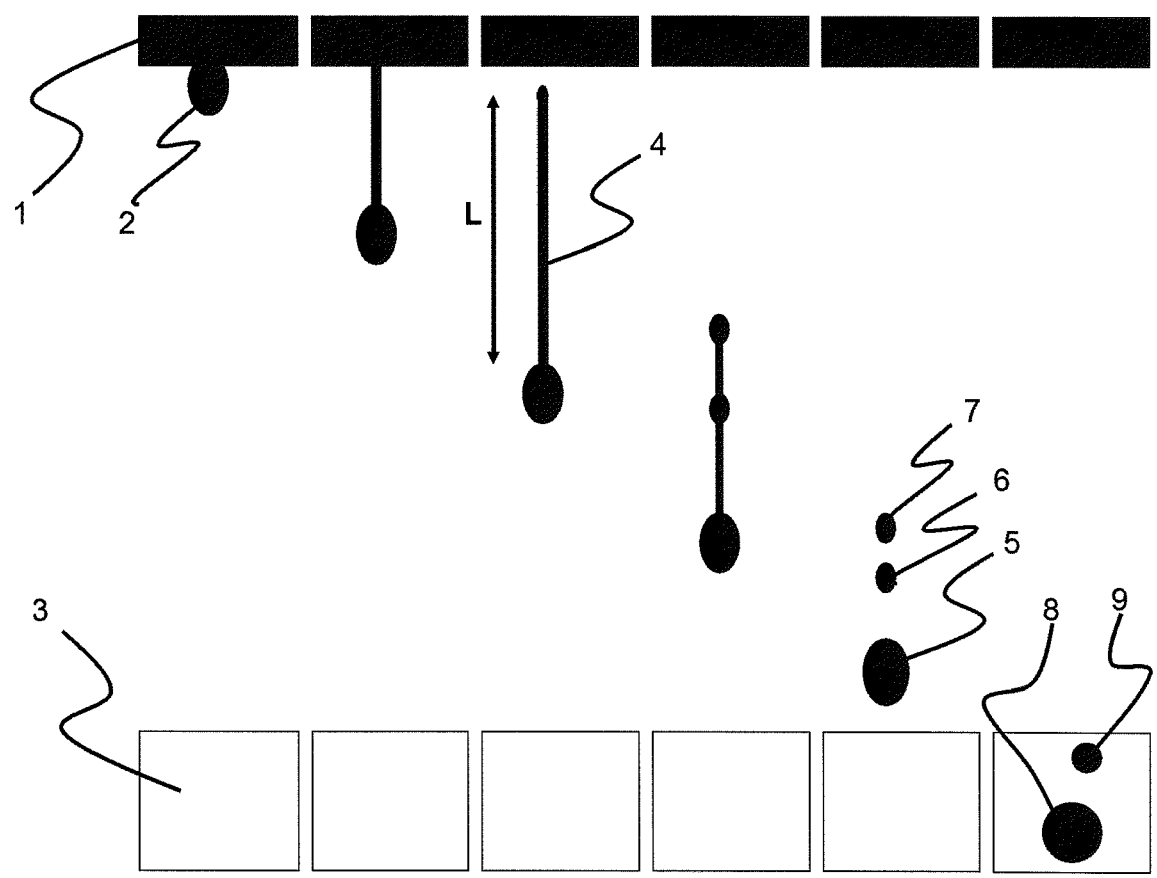
FIG. 2 is a schematic representation of a print head 1 ejecting an ink droplet 2 onto an ink-receiver 3. The ejected ink droplet 2 forms a tail 4 having a length L before splitting up in a main ink droplet 5 and one or more satellites. A satellite is an unwanted ink droplet produced behind the main ink droplet, which either merges with the main ink droplet (fast satellite 6) or drifts away from the main drop (slow satellite 7). On landing on the ink-receiver 3, the main ink droplet 5 forms an ink dot 8, while the slow satellite 7 forms a smaller secondary ink dot 9.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_2O$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Inkjet Inks

A liquid UV curable inkjet ink according to a preferred embodiment of the present invention contains one or more photoinitiators, an organic colour pigment and a polymerizable composition containing at least one monofunctional polymerizable compound and at least one polyfunctional polymerizable compound, wherein the organic colour pigment is present in an amount of 6.0 to 13.0 wt % based on the total weight of the liquid UV curable inkjet ink; the at least one polyfunctional polymerizable compound is present in an amount of at least 20.0 wt % based on the total weight of the polymerizable composition; and the UV curable inkjet ink has a viscosity at 45° C. and a shear rate of 10 s$^{-1}$ of at least 16.0 mPa·s.

The term "liquid" in liquid UV curable inkjet ink means that inkjet ink is a liquid at room temperature (25° C.), thereby stating that the liquid UV curable inkjet ink is not a so-called UV curable phase change or hot melt inkjet ink.

The organic colour pigment is preferably dispersed in the liquid vehicle of the inkjet ink by a polymeric dispersant. The liquid UV curable inkjet ink may contain a dispersion synergist to improve the dispersion quality and stability of the ink. Preferably, at least the magenta ink contains a dispersion synergist. A mixture of dispersion synergists may be used to further improve dispersion stability.

The liquid UV curable inkjet ink is preferably a so-called 100% solids UV curable inkjet ink. This means that no solvents, i.e. water or organic solvents, are present. However sometimes a small amount, generally less than 1 or 2 wt % of water based on the total weight of the inkjet ink, can be present. This water was not intentionally added but came into the inkjet ink via other components as a contamination, such as for example hydrophilic monomer.

The liquid UV curable inkjet ink preferably does not contain an organic solvent. But sometimes it can be advantageous to incorporate a small amount of an organic solvent to improve adhesion to the surface of a substrate after UV-curing. In this case, the added solvent can be any amount in the range that does not cause problems of solvent resistance and VOC. The liquid UV curable inkjet ink preferably contains 0 to 10 wt %, more preferably no more than 5.0 wt % of an organic solvent based on the total weight of the UV curable inkjet ink.

The liquid UV curable inkjet ink contains one or more photoinitiators for the polymerization of the polymerizable composition after UV exposure. In a preferred embodiment of the liquid UV curable inkjet ink, at least one of the one or more photoinitiators is selected from the group consisting of a polymeric photoinitiator, a polymerizable photoinitiator and a photoinitiator containing a plurality of photoinitiating groups. Preferably the liquid UV curable inkjet ink is cured by UV LEds having an emission wavelength higher than 360 nm. For this reason, the one or more photoinitiators preferably include an acylphosphine oxide photoinitiator and a thioxanthone photoinitiator.

The polymerizable composition contains at least one monofunctional polymerizable compound and at least one polyfunctional polymerizable compound. If a polymerizable photoinitiator is present in the inkjet ink, then this photoinitiator is also regarded to be part of the polymerizable composition. The at least one polyfunctional polymerizable compound is present in at least 20 wt % based on the total weight of the polymerizable composition.

In a more preferred embodiment of the liquid UV curable inkjet ink, the at least one polyfunctional polymerizable compound is present in an amount of 25.0 to 50.0 wt % based on the total weight of the polymerizable composition. In the latter case, an optimal compromise between scratch resistance and flexibility is obtained.

In a preferred embodiment of the liquid UV curable inkjet ink, the polymerizable composition is present in amount smaller than 75.0 wt %, more preferably smaller than 70.0 wt % and most preferably smaller than 68.0 wt % based on the total weight of the liquid UV curable inkjet ink.

The UV curable inkjet ink has a viscosity at 45° C. and a shear rate of 10 s$^{-1}$ of at least 16.0 mPa·s, preferably at least 20.0 mPa·s., more preferably 25.0 to 65.0 mPa·s.

The UV curable inkjet ink has a viscosity of at least 16.0 mPa·s at a shear rate of 10 s$^{-1}$ and a temperature of 45° C., more preferably a temperature of 50° C.

The liquid UV curable inkjet ink has at room temperature (25° C.) preferably a viscosity of at least 40.0 mPa·s, more preferably at least 50.0 mPa·s and most preferably between 60 mPa·s and 250 mPa·s. Above 250 mPa·s the pumping around of the UV curable inkjet ink requires more powerful pumps, which represents a financial penalty for the manufacturing of the inkjet printer. Above 40.0 mPa·s to 50.0 mPa·s, an enhanced dispersion stability of the organic colour pigment in the liquid UV curable inkjet ink is observed.

The surface tension of the liquid UV curable inkjet ink is preferably in the range of 20 mN/m to 30 mN/m at 25° C., more preferably in the range of about 22 mN/m to about 25 mN/m at 25° C.

The liquid UV curable inkjet ink may further also contain at least one inhibitor or stabilizer for improving the thermal stability of the ink.

The liquid UV curable inkjet ink may further also contain at least one surfactant for obtaining good spreading characteristics on a substrate.

For printing multi-colour images, the liquid UV curable inkjet ink is part of a UV curable inkjet ink set. A preferred UV curable inkjet ink set for printing different colours contains at least one liquid UV curable inkjet ink according to the invention. A simultaneous improvement for scratch resistance and flexibility is already observed with a single liquid UV curable colour inkjet ink according to the invention, but preferably a plurality liquid UV curable inkjet ink are present having a composition according to the invention In a particularly preferred embodiment, the UV curable inkjet ink set contains at least three liquid UV curable colour inkjet inks each containing one or more different organic colour pigments present in an amount of at least 5.0 wt %, more preferably at least 6.0 wt % and most preferably at least 6.5 wt % based on the total weight of the liquid UV curable colour inkjet ink; with the proviso that at least liquid UV curable inkjet ink is present having at least 6.0 wt % and more preferably at least 6.5 wt % based on the total weight of the liquid UV curable colour inkjet ink.

The UV curable inkjet ink set is preferably a UV curable CMYK or CRYK inkjet ink set. This UV curable inkjet ink set may also be extended with extra inks such as red, green, blue, and/or orange to further enlarge the colour gamut of the image. The UV curable inkjet ink set may also be extended by the combination of full density inkjet inks with light density inkjet inks. The combination of dark and light colour inks and/or black and grey inks improves the image quality by a lowered graininess.

The curable inkjet ink set may also include a colourless UV curable inkjet ink, such as a varnish or a primer. A varnish is used to enhance the glossiness of inkjet printed colour images. A primer can be used to improve the adhesion on difficult substrates like glass and polypropylene.

The curable inkjet ink set preferably also includes liquid UV curable white inkjet ink. The liquid UV curable white inkjet ink preferably contains a titanium dioxide pigment, preferably a rutile pigment, having an average particle size larger than 180 nm.

White inkjet inks are generally used for so-called "surface printing" or "backing printing" to form a reflection image on a transparent substrate. In surface printing, a white background is formed on a transparent substrate using a white ink and further thereon, a colour image is printed, where after the formed final image is viewed from the printed face. In so-called backing printing, a colour image is printed on a transparent substrate using colour inks and then a white ink is applied onto the colour inks, and the colour image is observed through the transparent substrate. In a preferred embodiment the liquid UV curable colour inkjet ink is jetted on at least partially cured white inkjet ink. If the white ink is only partially cured, an improved wettability of the colour inkjet ink on the white ink layer is observed.

The UV curable inkjet ink set is preferably a free radical curable inkjet ink set. It was found that cationically curable inkjet inks posed problems of jetting reliability due to UV stray light. UV stray light hitting the nozzle plate of an inkjet print head results into failing nozzles due to clogging by cured ink in the nozzle. Unlike free radical curable ink where radical species have a much shorter lifetime, a cationic curable ink continues to cure once an acid species has been generated by UV light in the nozzle.

Organic Colour Pigments

The liquid UV curable inkjet ink contains an organic colour pigment in an amount of 6.0 to 13.0 wt % based on the total weight of the liquid UV curable inkjet ink. An organic colour pigment includes in its chemical molecular structure carbon atoms, hydrogen atoms and at least one of sulphur atoms, oxygen atoms, nitrogen atoms, and selenium atoms. Carbon black and metal oxides, such as cobalt oxide or titanium dioxide are considered inorganic pigments. Organic colour pigments may however include a metal atom or ion, such as e.g. copper phthalocyanine pigments.

The organic colour pigment is preferably selected of the group consisting of may a cyan, magenta, yellow, red, orange, violet, blue, green, and brown, organic colour pigment. A colour pigment may be chosen from those disclosed by HERBST, Willy, et al. Industrial Organic Pigments, Production, Properties, Applications. 3rd edition. Wiley-VCH, 2004. ISBN 3527305769.

Suitable organic colour pigments are disclosed in paragraphs [0128] to [0138] of WO 2008/074548 (AGFA GRAPHICS).

In a preferred embodiment, the liquid UV curable inkjet ink includes an organic colour pigment having the numbers below described in the Colour Index.

In a preferred embodiment, the liquid UV curable inkjet ink is a liquid UV curable yellow inkjet ink including an organic colour pigment selected from the group consisting of C.I Pigment Yellow 120, C.I Pigment Yellow 150, C.I Pigment Yellow 151, C.I Pigment Yellow 155 and C.I Pigment Yellow 180, more preferably selected from the group consisting of C.I Pigment Yellow 151 and C.I Pigment Yellow 155.

A preferred organic colour pigment for the liquid UV curable cyan inkjet ink is C.I. Pigment Blue 15:4.

A preferred organic colour pigment for the liquid UV curable magenta or red inkjet ink is a quinacridone pigment, a diketopyrrolopyrrole pigment or mixed crystals thereof.

Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may also be used in the liquid UV curable inkjet ink.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

The organic colour pigment in preferably present in an amount of 6.5 wt % to 13.0 wt %, more preferably 7.0 wt % to 12.0 wt %, and most preferably 8.0 wt % to 11.0 wt %, with the weight percentage (wt %) based on the total weight of the liquid UV curable inkjet ink.

Inorganic Colour Pigments

The UV curable inkjet ink set for printing different colours containing a plurality of liquid UV curable inkjet inks includes preferably at least one black or grey UV curable inkjet ink. The liquid UV curable black inkjet ink includes preferably a carbon black pigment, more preferably further also a β-copper phthalocyanine pigment having an average particle size smaller than 200 nm. By including a β-copper phthalocyanine pigment in the black inkjet ink, images can be printed having an appealing neutral black or grey colour instead of a brownish black or grey colour.

The UV curable inkjet ink set for printing different colours containing a plurality of liquid UV curable inkjet inks preferably includes also a liquid UV curable white inkjet ink.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

The white pigment is preferably present in the range of 9 to 40 wt %, more preferably in the range of 12 to 35% by weight and most preferably in the range of 15 to 25% by weight, the weight percentage wt % based on the total weight of the inkjet ink. An amount of less than 9% by weight cannot achieve sufficient covering power and usually exhibits very poor storage stability and ejection property.

In the most preferred embodiment, the UV curable white inkjet ink preferably contains a titanium dioxide pigment having an average particle size larger than 180 nm. Titanium dioxide pigments with an average particle size above 180 nm have a strong opacifying capability compared to other inorganic white pigments, such as calcium carbonate having the same average particle size.

The average particle size of the inorganic pigments in the inkjet ink can be determined in the same manner as explained above for the organic colour pigments.

Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from NOVEON;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from CIBA SPECIALTY CHEMICALS INC;
DISPONER™ dispersants from DEUCHEM; and
JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 200 wt %, more preferably 10 to 120 wt %, most preferably 30 to 80 wt % based on the weight of the pigment.

Photoinitiators

The liquid UV curable inkjet ink contains one or more photoinitiators, preferably one or more free radical photoinitiators. A free radical photoinitiator is a chemical compound that initiates polymerization of monomers and oligomers when exposed to actinic radiation by the formation of a free radical.

Two types of free radical photoinitiators can be distinguished and used in the liquid UV curable inkjet ink. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the liquid UV curable inkjet ink may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).
The preferred co-initiators are aminobenzoates.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6trimethylbenzoyldiphenylphosphine oxide, 2-methyl-1-[4-(methylthio) phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a particularly preferred embodiment of the liquid UV curable inkjet ink, the one or more photoinitiators include an acylphosphine oxide photoinitiator and a thioxanthone photoinitiator. Such a combination allows for fast UV curing with UV LEDS emitting above 370 nm.

In a preferred embodiment, at least one of the one or more photoinitiators is selected from the group consisting of a polymeric photoinitiator, a polymerizable photoinitiator and a photoinitiator containing a plurality of photoinitiating groups, more preferably selected from the group consisting of a polymeric photoinitiator and a polymerizable photoinitiator. Such a diffusion hindered photoinitiator exhibits a much lower mobility in a cured layer of the liquid UV curable inkjet ink than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out e.g. from an outdoor billboard by acid rain.

Most preferably the diffusion hindered photoinitiator is a polymerizable photoinitiator, preferably having at least one acrylate group, more preferably at least two or three acrylate groups. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In a particularly preferred embodiment of the liquid UV curable inkjet ink, the one or more photoinitiators include an acylphosphine oxide photoinitiator and a polymeric or polymerizable thioxanthone photoinitiator. Such a combination allows for both the safety advantage, e.g. food packaging, and the fast UV curing with UV LEDS emitting above 370 nm. The acylphosphine oxide photoinitiator may be a bisacylphosphine oxide or a polymeric or polymerizable (bis)acylphosphineoxide photoinitiator.

Suitable polymeric and polymerizable acylphosphineoxide photoinitiators are disclosed in US 2015344711 A (FUJIFILM), WO 2015/031927 A (DURST) and US 2015197651 A (FUJIFILM).

A preferred amount of photoinitiator is 0-50 wt %, more preferably 0.1-20 wt %, and most preferably 0.3-15 wt % of the total weight of the liquid UV curable inkjet ink. In the most preferred embodiment, the amount of photoinitiator is at least 7.0 wt % or 8.0 wt % of the total weight of the liquid UV curable inkjet ink for obtaining high curing speed.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The liquid UV curable inkjet ink preferably comprises the diffusion hindered co-initiator in an amount of 0.1 to 50 wt %, more preferably in an amount of 0.5 to 25 wt %, most preferably in an amount of 1 to 10 wt % of the total weight of the liquid UV curable inkjet ink.

Monofunctional Polymerizable Compounds

The polymerizable composition of the liquid UV curable inkjet ink according to a preferred embodiment of the present invention contains at least one monofunctional polymerizable compound. A monofunctional polymerizable compound contains a single polymerizable group, preferably a free radical polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

Any monofunctional polymerizable compound commonly known in the art may be employed. A combination of monomers and oligomers may be used. The monofunctional polymerizable compounds may be any monomer and/or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate. In a more preferred embodiment, the monofunctional polymerizable compounds are selected from monoacrylates and vinyllactams, such as N-vinylcaprolactam. Particularly preferred monofunctional polymerizable compounds are selected from the group consisting of isoamyl acrylate, stearyl acrylate, lauryl acrylate, octyl acrylate, decyl acrylate, isoamyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine In a more preferred embodiment, the monofunctional polymerizable compounds are selected from monoacrylates and vinyllactams, such as N-vinylcaprolactam.

The N-vinyllactam is preferably a compound represented by Formula (I):

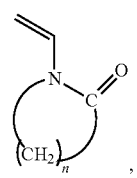

Formula (I)

wherein n denotes an integer of 2 to 6; n is preferably an integer of 3 to 5 from the viewpoint of flexibility after the ink composition is cured, adhesion to a substrate, and ready availability of starting materials, n is more preferably 3 or 5, and n is particularly preferably 5, which is N-vinylcaprolactam. N-vinylcaprolactam is preferable since it is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring. The compound represented by Formula (a) may be used singly or in a combination of two or more compounds.

For certain applications preferably no monofunctional (meth)acrylates are employed. For example, when the substrate is a textile that is worn directly on the human skin it may give rise to skin sensitization. In such a case, the monomers and oligomers are preferably selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including an allyl ether group, vinyl carbonate group and alkyne group.

Polyfunctional Polymerizable Compounds

The polymerizable composition of the liquid UV curable inkjet ink according to a preferred embodiment of the present invention contains at least one polyfunctional polymerizable compound. A polyfunctional polymerizable compound contains two, three or more polymerizable groups, preferably free radical polymerizable groups selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

Any polyfunctional polymerizable compound commonly known in the art may be employed. A combination of monomers and oligomers may be used. The polyfunctional polymerizable compounds may be any monomer and/or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units.

In a preferred embodiment, the polyfunctional polymerizable compound is a duofunctional acrylate containing two polymerizable groups, namely two acrylate groups.

Preferred polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other polyfunctional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

The polyfunctional polymerizable compound may have two different polymerizable groups, such as a vinylether group and an acrylate group. Preferred vinylether acrylates are those disclosed in U.S. Pat. No. 6,310,115 (AGFA). A particularly preferred compound is 2-(2-vinyloxyethoxy) ethyl acrylate. Other suitable vinylether acrylates are those disclosed in columns 3 and 4 of U.S. Ser. No. 67/679,890 B (NIPPON SHOKUBAI).

Instead of difunctional or polyfunctional acrylates, also their methacrylate analogues may be used.

For certain applications preferably no polyfunctional (meth)acrylates are employed. For example, when the substrate is a textile that is worn directly on the human skin it may give rise to skin sensitization.

A preferred alternative free radical curing chemistry is the so-called thiol-ene and thiol-yne chemistry. In such a chemistry, a combination of at least one polyfunctional thiol compound and at least one polyfunctional polymerizable compound is used. The polyfunctional polymerizable compound is a polyfunctional monomers or oligomer having a plurality of polymerizable groups selected from a group consisting of a vinyl group, an acrylamide group, a methacrylamide group, a vinyl carbonate group, a vinyl ether group, a vinyl ester group, a vinyl carbamate group, an allyl ether groups, an allyl ester group and an alkyne group. Particularly preferred are polymerizable compounds including allyl ether groups, vinyl carbonate groups and alkyne groups.

Synthesis of such monomers is disclosed in the relevant literature, for example in HURD, Charles D. Vinylation and the Formation of Acylals. *Journal Am. Chem. Soc.* 1956, vol. 78, no. 1, p. 104_106.; LOBELL, M., et al. Synthesis of hydroxycarboxylic acid vinyl esters. *MP Synthesis*. 1994, vol. 4, p. 375-377.; LEE, T. Y., et al. Synthesis, Initiation, and Polymerization of Photoinitiating Monomer. *Macromolecules*. 2005, vol. 38, no. 18, p. 7529-7531.; ATTA, A.M., et al. New vinyl ester resins based on rosin for coating applications. *React. Funct. Polym.* 2006, vol. 66, p. 1596-1608.; WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. *Green Chemistry*. 2001, vol. 3, p. 123-125.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephtalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephtalic acid divinyl ester, trimellitic acid trivinyl ester, pyromellitic acid tetravinyl ester, citric acid trivinyl ester and glutaric acid divinyl ester.

Thiol-yne chemistry has been described as an extension for thiol-ene chemistry to design cross-linked networks with a higher cross-linking density and glass transition temperature in comparison with thiol-ene based networks. The chemistry has recently been reviewed by Lowe et al. (Journal of Materials Chemistry, 20, 4745-4750 (2010)) and by Hoogenboom R. (Angew. Chem. Int. Ed. 49, 3415-3417 (2010)).

Optionally photochemically induced radical double addition of polyfunctional thiol compounds to di- or multifunctional alkynes is the basis of thiol-yne chemistry. In principle any di- or multifunctional alkyne, including polymeric alkynes, can be used in combination with any di- or polyfunctional thiol compound.

In a preferred embodiment, at least one of the alkyne functions in the di- or polyfunctional alkynes is represented by H—C≡C—*, where represents the covalent bond to the rest of the di- or polyfunctional alkyne.

In a more preferred embodiment, all of the alkyne groups in the di- or polyfunctional alkyne are represented by H—C≡C—*.

In an even more preferred embodiment, the alkyne functions in said di- or polyfunctional alkyne is selected from the group consisting of a propargyl ether, a propargyl ester, a propargyl urethane, a propargyl ureum, a propargyl carbonate, a propargyl amide, a propargyl thioether and a propargyl amine. In a further preferred embodiment, said alkyne group is selected from the group consisting of a propargyl ether, a propargyl ester and propargyl urethane, a propargyl ester and a propargyl urethane being particularly preferred.

Preferred thiol compounds for conducting thiol-ene or thiol-yne chemistry are thiol molecules including at least two thiol groups. Preferred thiol molecules include two to six thiol groups, preferably three to five thiol groups, and most preferably four thiol groups.

The thiol molecule is preferably a compound comprising an aliphatic thiol.

In a preferred embodiment, the thiol molecule is represented by Formula (I):

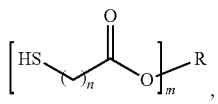

Formula (I)

wherein n represents an integer from 1 to 4; m represents an integer from 2 to 6; and R represents an m-valent linking group comprising at most 20 carbon atoms.

In a preferred embodiment n represents 1 or 2.

In a preferred embodiment m represents 3 or 4.

In a more preferred embodiment n represents 1 or 2 and m represents an integer from 2 to 6. In the most preferred embodiment n represents 1 or 2 and m represents 3 or 4.

In a preferred embodiment, the thiol compound has a molecular weight smaller than 1,000 Dalton, more preferably the thiol compound has a molecular weight smaller than 500 Dalton.

Particularly preferred primary thiol molecules include tetra(ethylene glycol) dithiol (CAS 2781-02-4), glycol di(3-mercaptopropionate) (CAS 22504-50-3), glyceryl dithioglycolate (CAS 63657-12-5), glycol dimercaptoacetate (CAS 123-81-9), trimethylolpropane trimercaptoacetate (CAS 10193-96-1), pentaerythritol tetramercaptoacetate (CAS 10193-99-4), glycol di(3-mercaptopropionate) (CAS 22504-50-3), trimethylolpropane tri(3-mercaptopropionate) (CAS 33007-83-9), pentaerythritol tetra(3-mercaptopropionate) (CAS 7575-23-7), dipentaerythritol hexa(3-mercaptopropionate) (CAS 25359-71-1), ethoxylated-trimethylolpropane tri-3-mercaptopropionate (CAS 345352-19-4), and tris[2-(3-mercaptopropionyloxy)ethyl]isocyanurate (CAS 36196-44-8).

The above and other thiol molecules are commercially available, e.g. as Thiocure™ grades from Bruno Bock Chemische Fabrik GmbH & Co. KG.

Suitable thiol molecules include 1,1,1-trimethylolpropane tris(3-mercaptopropyl)ether, 1,2,4-tris(2-mercaptoethyl)cyclohexane, tri(3-mercaptopropyl) trimetylolpropane and others disclosed by WO 2011/004255 A (KUROS BIOSURGERY).

It was found that thiol molecules having secondary thiol groups exhibited less odour than thiol molecules having only primary thiol groups. Hence, the thiol molecule preferably includes at least two secondary thiol groups, more preferably the thiol molecule includes two to six secondary thiol groups, preferably three to five secondary thiol groups, and most preferably four secondary thiol groups.

A particularly preferred thiol molecule having secondary thiol groups is pentaerythritol tetrakis (3-mercaptobutylate). The latter is available as Omnimer™ PE1 from IGM RESINS and Karenz MT™ PE1 from SHOWA DENKO.

For minimizing odour of the liquid UV curable inkjet ink, especially after UV curing, the molar ratio of thiol molecules having primary thiol groups over thiol compounds having at least one secondary thiol group is preferably 0 to 4, more preferably the molar ratio is 0, meaning that the thiol molecules in the liquid UV curable inkjet ink consist of thiol molecules containing at least one secondary thiol group. For calculating the molar ratio, a thiol molecule having primary thiol groups is considered to have only primary thiol groups, while thiol molecules containing at least one secondary thiol group may also include primary thiol groups.

In the most preferred embodiment, the thiol molecules consist of thiol molecules containing only secondary thiol groups.

For improving mechanical performance and limited potential for water uptake, leachables and degradation, the thiol molecules are preferably ester-free thiol molecules.

Particularly preferred ester-free thiol molecules are silane based thiol molecules and siloxane based thiol molecules. Such compounds can easily be synthesized by reacting thioacetic acid with functional alkenes to give thioester derivatives that can be hydrolyzed under alkaline or acidic conditions.

Suitable silane based thiol molecules and siloxane based thiol molecules are disclosed by WO 2011/004255 A (KUROS BIOSURGERY), especially those in the examples 1 to 6.

A preferred example of a silane based thiol molecule for use in the liquid UV curable inkjet ink is tetra(3-mercaptopropyl)silane, which synthesis is described in Example 5 of WO 2011/004255 A (KUROS BIOSURGERY).

A preferred example of a siloxane based thiol molecule for use in the liquid UV curable inkjet ink is 2,4,6,8-tetra (2-mercaptoethyl)-2,4,6,8-tetramethylcyclotetrasiloxane, which synthesis is described in Example 4 of WO 2011/004255 A (KUROS BIOSURGERY).

More preferably silane based thiol molecules and siloxane based thiol molecules including secondary thiol groups are used in the liquid UV curable inkjet ink according to the invention. Such thiol molecules not only improve mechanical properties, but also reduce the odour problem.

A preferred example of a silane based thiol molecule containing secondary thiol groups is the compound represented by the formula TH-1:

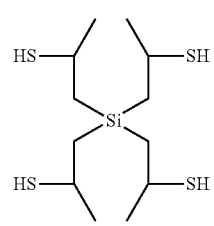

Formula TH-1

The synthesis of TH-1 may be performed in a multi-step reaction. In the first step, hydrogen bromide is reacted with tetraallylsilane to give tetrakis(2-bromopropyl)silane. The latter is converted with thiourea to its isothiouronium salt, which is then hydrolyzed with aqueous sodium hydroxide to give TH-1.

The thiol compound may also be a so-called thiol pigment. A thiol pigment is an inorganic pigment, such as a silica pigment or a titaniumdioxide pigment, which surface has been functionalized with two or more thiol groups. The main advantage is that liquid UV curable inkjet inks containing a thiol pigment exhibit no or minor odour prior to UV curing, which is generally not the case for liquid UV curable inkjet inks containing polyfunctional thiol molecules. The latter cause a bad odour even at small amounts of evaporated thiol molecules.

Silica nanoparticles are preferred because they are usually small-sized, monodisperse and can be easily surface-modified. A monodisperse distribution is advantageous for the transparency of printed colour inks, thus enlarging the colour gamut.

Thiol groups are preferably introduced on the surface using an alkoxysilane containing a thiol group. Typical examples of siloxanes containing a thiol are 3-mercaptopropyl triethoxysilane, 3-mercaptopropyl trimethoxysilane, 2-mercaptoethyl triethoxysilane, 4-mercaptobutyl triethoxysilane, 2-mercaptopropyl trimethoxysilane and 3-mercaptobutyl trimethoxysilane. A preferred alkoxysilane containing a thiol group is 3-mercaptopropyl trimethoxysilane (MPTMS).

An example of a suitable synthesis scheme for a thiol pigment is as follows: a dry phase deposition method was used to functionalize silica particles (e.g. Ludox™ TM-50 from GRACE having an average particle size of about 22 nm). The silica particles were dispersed in anhydrous ethanol (15 mL of ethanol per gram of silica) and MPTMS (available from ALDRICH) was added such that the ratio of the amount of silica (in g) to the amount of MPTMS (in mL) was 3:7. Ultra high purity grade nitrogen was bubbled through the mixture to evaporate the ethanol under fume hood, thus depositing MPTMS on the surface of the silica. For the silanization reaction, the silica was then placed in oven at 120° C. for 9 hours. The material was allowed to cool and washed twice with 50 mL of anhydrous ethanol to remove any physically adsorbed MPTMS and dried again in oven. The silica was analyzed using FTIR to verify the MPTMS deposition on the silica surface.

The number of thiol groups on the thiol pigment surface can be easily modified as desired as long as at least two thiol groups are present. However, usually a large number of thiol groups is present on the pigment surface, preferably more than ten thiol groups, more preferably even more than twenty or fifty thiol groups.

A commercially available thiol pigment having however a large average particle size of 2.2 μm is Aktisil™ MM mercapto modified from HOFMANN MINERAL. The average particle size of the thiol pigment as measured according to ISO 13320-1 is preferably between 10 nm and 1 μm, more preferably between 15 nm and 250 nm, and most preferably between 20 nm and 150 nm.

Due to its higher molecular weight per unit, it is not necessary to include secondary thiol groups for improvement of the odour. In fact preferably primary thiol groups are included because of their greater reactivity in thiol-ene and thiol-yne click chemistry.

Stabilizers

The liquid UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

A preferred polymerization inhibitor is Irgastab™ UV10 from BASF.

In a preferred embodiment, the polymerization inhibitor is a mixture of different types of polymerization inhibitors. Preferred polymerization inhibitors are mixtures of an oxyl free radical-based polymerization inhibitor, a phenol-based polymerization inhibitor, and an amine-based polymerization inhibitor. Suitable examples are given in EP 2851402 A (FUJIFILM).

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the liquid UV curable inkjet ink.

Surfactants

Surfactants may used in the liquid UV curable inkjet ink reduce the surface tension in order to improve the spreading of the inkjet ink. A liquid UV curable inkjet ink must meet stringent performance criteria in order to be adequately jettable with high precision, reliability and during an extended period of time. The surface tension is not only determined by the amount and type of surfactant, but also by the polymerizable compounds and other additives in the ink composition.

The surfactant(s) can be anionic, cationic, non-ionic, or zwitter-ionic and are preferably added in a total quantity of no more than 2 wt %, preferably less than 1 wt % based on the total weight of the liquid UV curable inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOLTN 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a polymerizable surfactant. Suitable polymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are preferred in the liquid UV curable inkjet ink of the present invention, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysilixone hexaacrylate from CYTEC INDUSTRIES BV and Efka™-3000 series (including Efka™-3232 and Efka™-3883) from EFKA CHEMICALS B.V.; and those supplied by MOMENTIVE PERFORMANCE MATERIALS, such as Coatasil™ 7500.

Preparation of Inkjet Inks

The preparation of pigmented UV curable inkjet inks is well-known to the skilled person. Preferred methods of preparation are disclosed in paragraphs [0076] to [0085] of WO 2011/069943 (AGFA).

Inkjet Printing Methods

A UV curable inkjet printing method according to a preferred embodiment of the present invention includes the steps of: a) jetting one or more liquid UV curable inkjet inks as described above with a print head at a jetting temperature of 45° C. or more on a substrate; and b) UV curing the jetted liquid UV curable inkjet ink on the substrate.

The one or more liquid UV curable inkjet inks are preferably at a temperature between 45° C. and 65° C., more preferably not higher than 55° C. or 60° C. Above 65° C. the reliability of the liquid UV curable inkjet ink is reduced as undesired 'dark' polymerization may occur, i.e. polymerization not caused by UV radiation but by remaining an extended time at high temperature.

The print head is preferably a through-flow piezoelectric drop-on-demand print head. For limiting the time that the liquid UV curable inkjet ink remains at higher temperatures, the liquid UV curable inkjet ink may be heated to temperatures to the jetting temperature just prior to entering the through-flow print head, while upon exiting the through-flow print head unused ink may be cooled down to 45° C. or less. In this way, the major part of the ink circulation circuit of the ink supply to the through-flow piezoelectric DOD print head is kept at a temperature preventing undesired 'dark' polymerization of the inkjet ink.

The UV curable inkjet printing method preferably makes use of UV LED curing that is performed between 100 ms to 1 s, more preferably between 400 to 600 ms after the liquid UV curable inkjet ink was jetted on the substrate.

In a preferred embodiment, the average ink layer thickness to reach the target density of the UV cured one or more liquid UV curable inkjet ink is smaller than 8 µm, preferably smaller than 6 µm and most preferably smaller than 3 or 4 µm.

Printing Devices

The liquid UV curable inkjet ink is jetted by one or more print heads ejecting small droplets in a controlled manner through nozzles onto a substrate moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so called push mode type piezoelectric print head, which has a rather large piezo-element capable of ejecting larger or high viscous inkjet ink droplets. Such a print head is available from RICOH as the GEN5s print head.

A preferred piezoelectric print head is a so-called through-flow piezoelectric drop-on-demand print head. Such a print head is available from TOSHIBA TEC as the CF1ou print head.

However the inkjet printing method according to the present invention is not restricted to piezoelectric inkjet printing. Other inkjet print heads can be used and include various types, such as a continuous type print head.

The inkjet print head normally scans back and forth in a transversal direction across the moving ink-receiver surface. Often the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the ink-receiver surface is transported under the inkjet print heads.

In a particularly preferred embodiment, the inkjet printing of the liquid UV curable inkjet ink is performed in a multi-pass printing mode. Multi-pass printing is a technique used to reduce banding in ink-jet printing. Dots of ink, when still in liquid form, tend to run together due to surface tension. This is referred to as coalescence. To print a high quality image it is important to print individual round dots. But to achieve full saturated colours, the dots must overlap to completely cover the paper. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is to 2 to 6 passes, more preferably no more than 4 passes.

An advantage of using a multi-pass printing mode is that the liquid UV curable inkjet ink is cured in a consecutive passes, rather than in a single pass which would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for wide format substrates.

Curing Devices

The liquid UV curable inkjet ink according to the present invention is cured by ultraviolet radiation.

In inkjet printing, the UV curing device may be arranged in combination with the print head of the inkjet printer, travelling therewith so that the liquid UV curable inkjet ink is exposed to curing radiation very shortly after been jetted.

In such an arrangement it can be difficult to provide a small enough UV radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a particularly preferred embodiment, the UV curing is performed using UV LEDs having an emission wavelength higher than 370 nm.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates

There is no real limitation on the type of substrate for inkjet printing the liquid UV curable inkjet ink of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

The substrate may also be pre-treated, e.g. by corona, plasma or flame treatment.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

In a preferred embodiment of the inkjet printing method, the substrate is a rigid medium selected from rigid PVC, paperboard, corrugated and wood.

In a preferred embodiment of the inkjet printing method, the substrate is substrate suitable for soft signage applications, such as banners, posters, POP/POS displays, indoor wall graphics, tradeshow displays, parasols, flags, outdoor advertising and backdrops.

A major advantage of the current liquid UV curable inkjet ink in textile inkjet printing is that not only a wide range of textiles can be printed upon, but also that the touch-and-feel is improved compared to standard UV curable inkjet inks. The reason is that the layer thickness obtained after printing the liquid UV curable inkjet inks of the present invention is much smaller than with the standard UV curable inkjet inks.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

The liquid UV curable inkjet inks of the invention are also very suitable for inkjet printing on leather, especially on natural leather.

EXAMPLES

Materials

All materials used in the examples were readily available from standard sources such as Sigma-Aldrich (Belgium) and Acros (Belgium) unless otherwise specified.

PV19 is a C.I. Pigment Violet 19 pigment for which Ink Jet Magenta E5B 02 from CLARIANT was used.

PR57 is a C.I. Pigment Red 57.1 pigment for which Symyler™ Brilliant Carmine 6B350SD from SUN CHEMICAL was used.

PY150 is a C.I. Pigment Yellow 150 pigment for which Cromophtal™ yellow D1085 from BASF was used.

5B550 is a carbon black pigment for which Special Black™ 550 from EVONIK (DEGUSSA) was used.

TIO2 is a titanium dioxide pigment available as Sachtleben RDI-S from SACHTLEBEN.

PB15:4 is an abbreviation used for Hostaperm™ Blue P-BFS, a C.I. Pigment Blue 15:4 pigment from CLARIANT.

E7701 is a polyacrylate dispersion agent available as Efka™ 7701 from BASF.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

535000 is an abbreviation used for SOLSPERSE™ 35000, a polyethyleneimine-polyester hyperdispersant from LUBRIZOL.

DPGDA is dipropylene glycol diacrylate available as Sartomer™ SR508 from ARKEMA.

PEA is 2-phenoxyethyl acrylate available as Sartomer™ SR339C from ARKEMA.

VEEA is 2-(2'-vinyloxyethoxy)ethyl acrylate, a difunctional monomer available from NIPPON SHOKUBAI, Japan.

MPDA is 3-methyl 1,5-pentanediol diacrylate available as Sartomer™ SR341 from ARKEMA.

(EO)3TMPTA is an ethoxylated (EO3) trimethylolpropanetriacrylate available as Miramer™ M3130 from RAHN.

CN3755 is an acrylated amine synergist available as Sartomer™ CN 3755 from ARKEMA.

C704 is an acrylated polyester adhesion promoter available as Sartomer™ CN704 from ARKEMA.

EBLEO is a polyfunctional acrylated photoinitiator available as EBECRYL™ LEO 10101 from ALLNEX.

STABI-1 and STABI-2 are mixtures forming a polymerization inhibitor having a composition according to Table 1, wherein DPGDA or PEA is used in order to arrive at the desired wt % of polyfunctional and monofunctional polymerizable compounds.

TABLE 1

| wt % of Component | STABI-1 | STABI-2 |
|---|---|---|
| PEA | 82.4 | — |
| DPGDA | — | 82.4 |
| p-methoxyphenol | — | 4.0 |
| 2,6-di-tert-butyl-4-methylphenol | — | 10.0 |
| Cupferron ™ AL | — | 3.6 |

Cupferron™ AL is aluminum N-nitrosophenylhydroxylamine from WAKO CHEMICALS LTD.

STABI-3 is 4-hydroxy-2,2,6,6-tetramethylpiperidinooxy sebacate available as Irgastab™ UV 10 from BASF.

TPO-L is 2,4,6-trimethylbenzoyl phenylphosphinic acid ethyl ester available as Lucirin™ TPO-L from BASF.

BAPO is a bis(2,4,6-trimethylbenzoyl)-phenylphosphineoxide photoinitiator available as Irgacure™ 819 from BASF.

DETX is 2,4-diethylthioxanthone available as Genocure™ DETX from RAHN.

GAB is a polymeric tertiary amine available as Genopol™ AB-1 from RAHN.

Tegorad™ 2100 is a radically cross-linkable silicone acrylate available from EVONIK. US 2011086221 (3M) describes Tegorad™ 2100 as:

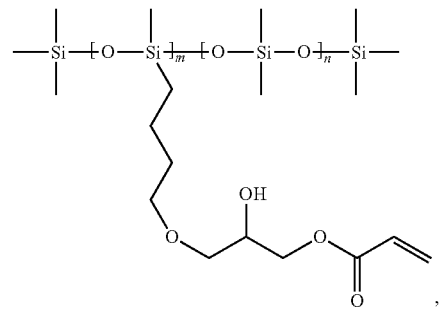 [SMILES: C=CC(=O)OCC(O)COCCCC[Si](C)(O[Si](C)(C)C)O[Si](C)(C)O[Si](C)(C)C]

wherein n ranges from 10 to 20 and m ranges from 0.5 to 5.

C7500 is a silicone surfactant available as COATOSIL™ 7500 from MOMENTIVE PERFORMANCE MATERIALS.

UV3510 is Byk™ UV3510, a polyether modified polydimethylsiloxane, supplied by BYK Chemie GmbH.

AXANTH is a polymerizable thioxanthone according to Formula (AX-1):

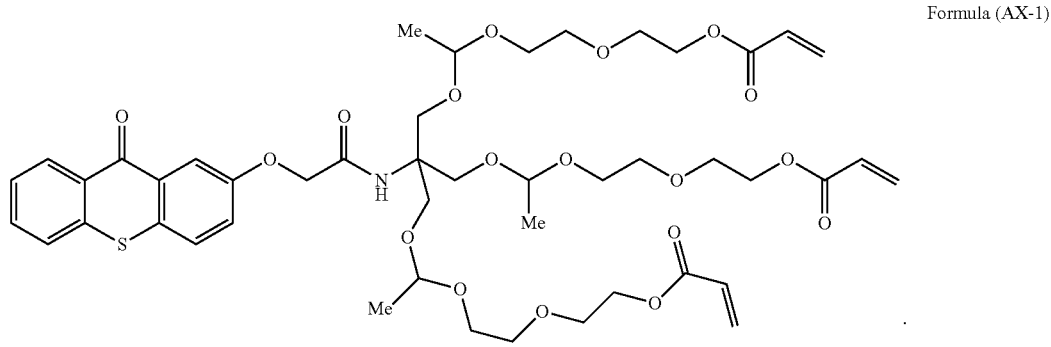 [SMILES: C=CC(=O)OCCOCCOC(C)OCC(COC(C)OCCOCCOC(=O)C=C)(COC(C)OCCOCCOC(=O)C=C)NC(=O)COc1ccc2sc3ccccc3c(=O)c2c1]

Formula (AX-1)

This photoinitiators was synthesized as follows:

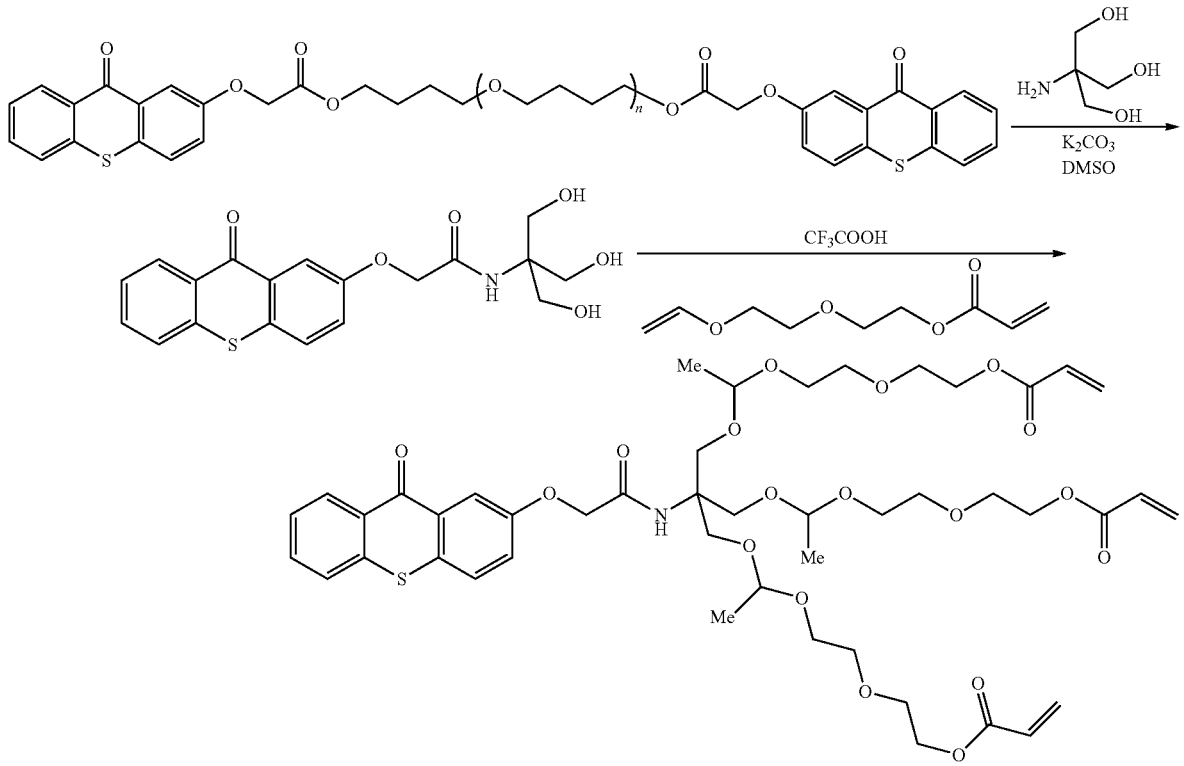

Step 1: The Aminolysis of Omnipol™ TX 395 g Omnipol™ TX, supplied by IGM, was dissolved in 1850 ml dimethyl sulfoxide. The reaction mixture was heated to 60° C. and 363 g (3 mol) tris(hydroxymethyl) aminomethane and 415 g (3 mol) potassium carbonate were added. The reaction was allowed to continue for 2 hours at 60° C. The reaction mixture was allowed to cool down to room temperature. The precipitated salts were removed by filtration and the reaction mixture was added to a mixture of 1500 ml water and 250 ml acetone. The intermediate thioxanthone precipitated from the medium, was isolated by filtration and dried. The crude thioxanthone was treated with 1500 ml acetone, isolated by filtration and dried. 260 g of the thioxanthone was isolated (TLC-analysis: RP-C18 (Partisil™ KC18F, supplied by Whatman), eluent MeOH/0.5 M NaCl, $R_f$=0.55). TLC analysis showed the presence of a small amount of an isomeric structure ($R_f$=0.60). The following structure was assigned to the isomer:

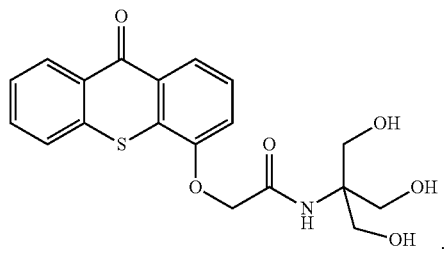 [SMILES: O=C(COc1cccc2c(=O)c3ccccc3sc12)NC(CO)(CO)CO]

The intermediate was further used as a mixture of the main isomer and the minor isomer.

Step 2: The Addition to VEEA:

22 g (58 mmol) of the amido-trihydroxy-thioxanthone was added to 227.8 g (1.224 mol) VEEA. 0.13 g (86 µl, 1.16 mmol) trifluoroacetic acid and 0.25 g (1.16 mmol) BHT were added and the mixture was heated to 77° C. The reaction was allowed to continue at 77° C. for 16 hours. The reaction was allowed to cool down to room temperature and 20 g of activated Lewatit M600 MB was added. The mixture was stirred for four hours at room temperature. The ion exchanger was removed by filtration. AX-1 was used as a solution in VEEA. (TLC-analysis: RP-C18 (Partisil™ KC18F, supplied by Whatman), eluent: MeOH/0.5 M NaCl 80/20, $R_f$=0.18). Based on $^1$H-NMR analysis, the solution contained 19 wt % AX-1.

PET100 is a 100 µm unsubbed PET substrate with on the backside an anti-blocking layer with antistatic properties available from AGFA-GEVAERT as P100C PLAIN/ABAS.

Measurement Methods

1. Viscosity

The viscosity of the UV curable inkjet inks was measured at 25° C. or 45° C. and at a shear rate of 10 s$^{-1}$ or 1,000 s$^{-1}$ using a Rotovisco™ RV1 viscometer from HAAKE.

2. Flexibility

A liquid UV curable inkjet ink was coated on a Metamark™ MD5-100 substrate using a bar coater. The coated sample was fully cured using a Fusion DRSE-120 conveyer, equipped with a Fusion VPS/I600 lamp (D-bulb), which transported the samples under the UV-lamp on a conveyer belt at a speed of 20 m/min.

The flexibility was determined using a custom built apparatus shown in FIG. 5 for stretching a strip having a length of 8 cm and a width of 1 cm obtained from the coated sample using a cutter. The strip was mounted between a first fixed wall and a second wall which could be horizontally displaced by rotation of a handle.

The strip was elongated from an original length L1 of 5 cm to the length L2 at which the strip ruptured. The elongation was calculated as a percentage according to Formula (III):

Elongation(%)=(L2−L1/L1)×100     Formula (III).

If no rupture of the strip was observed at an elongation of 150%, then the flexibility was evaluated as ">150%". Acceptable flexibility means an elongation of at least 40%.

3. Curing Speed

A liquid UV curable inkjet ink was coated on a PET100 substrate using a bar coater and a 10 μm wired bar. The coated sample was cured using a Fusion DRSE-120 conveyer, equipped with a Fusion VPS/I600 lamp (D-bulb), which transported the samples under the UV-lamp on a conveyer belt at a speed of 20 m/min. The maximum output of the lamp was 1.05 J/cm$^2$ and a peak intensity of 5.6 W/cm$^2$. The percentage of the maximum output of the lamp was taken as a measure for curing speed, the lower the number the higher the curing speed. A sample was considered as fully cured at the moment scratching with a Q-tip caused no visual damage. Table 2 shows the maximum peak intensity (MPI) in W/cm$^2$ and the dose in J/cm$^2$ of the D-bulb for the different UV regions measured with a UV Power Puck 8651 from EIT Inc. (USA) at different settings of the lamp output for a belt speed of 20 m/min.

TABLE 2

| Lamp Output | UVC (250-260 nm) | | UVB (280-320 nm) | | UVA (320-390 nm) | | UVF (395-445 nm) | |
|---|---|---|---|---|---|---|---|---|
| | MPI | Dose | MPI | Dose | MPI | Dose | MPI | Dose |
| 100% | 0.06 | 0.01 | 0.78 | 0.14 | 3.16 | 0.59 | 1.63 | 0.31 |
| 80% | 0.05 | 0.01 | 0.55 | 0.11 | 2.12 | 0.40 | 1.10 | 0.20 |
| 60% | 0.04 | 0.01 | 0.42 | 0.08 | 1.35 | 0.26 | 0.64 | 0.12 |
| 40% | 0.03 | 0.01 | 0.26 | 0.05 | 0.51 | 0.09 | 0.24 | 0.04 |

The curing speed should be less than 100%, preferably no more than 95% as lamp power decreases with aging. A curing speed higher than 100% means that the coated sample had to be conveyed under the lamp more than once.

4. Scratch Resistance

A liquid UV curable inkjet ink was coated on a PET100 substrate using a bar coater. The coated sample was fully cured using a Fusion DRSE-120 conveyer, equipped with a Fusion VPS/I600 lamp (D-bulb), which transported the samples under the UV-lamp on a conveyer belt at a speed of 20 m/min.

The scratch resistance of the coated sample of a liquid UV curable inkjet was determined according to ISO 4586-2:2004 (E)/ASTM C1624 using a Rockwell indenter with parameters: Speed 30 mm/sec; Load: 10-200 mN; Test area length 100 mm; and Tip: diamond: r 15 μm, 90°.

This test ran a diamond topped needle across the ink surface while the pressure onto the needle was increased. The test started with a pressure of 10 mN and then went up to 200 mN. The result of the Rockwell indenter scratch test was always the pressure value which revealed the first microscopic cracks in the pressure trail of the needle. So, the position where the needle started to penetrate the ink layer, marked the maximum force applicable to the layer without scratching it. Using a microscope, the evaluation of the scratch resistance was made in accordance with the classification described in Table 3.

TABLE 3

| Classification | Evaluation |
|---|---|
| +++ | No scratch observed at 120 mN |
| ++ | Scratch observed between 70 mN to less than 120 mN |
| + | Scratch observed between 60 mN to less than 70 mN |
| − | Scratch observed between 50 mN to less than 60 mN |
| −− | Scratch observed at less than 50 mN |

5. Optical Density

The optical density was measured in reflection using a Macbeth™ TR924 spectrodensitometer using a visual filter.

5. Average Particle Size

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

6. Dynamic Viscosity

The dynamic viscosity was determined using a DHR2-rheometer from TA Instruments equipped with a 60 mm 1° stainless steel cone. For measuring at a specific temperature, a conditioning step was performed without pre-shear. Upon measuring the shear rate was increased logarithmically between 1 en 1000 s$^{-1}$ with 5 points per decade.

Example 1

This example illustrates the improvements in scratch resistance and flexibility when using UV curable inkjet inks according to the present invention.

Preparation of Pigment Dispersion CYAN1

The pigment dispersion CYAN1 was made by mixing the components according to Table 4 for 30 minutes using a DISPERLUX™ disperser from DISPERLUX S.A.R.L., Luxembourg. The dispersions were then milled using a Bachofen DYNOMILL ECM mill filled with 0.4 mm yttrium stabilized zirconia beads ("high wear resistant zirconia grinding media" from TOSOH Co.). The mixtures were circulated over the mill for 2 hours. After milling, the pigment dispersions were discharged over a 1 μm filter into a vessel.

TABLE 4

| Component | wt % |
|---|---|
| PB15:4 | 20.0 |
| E7701 | 13.3 |
| STABI-1 | 1.0 |
| PEA | 65.7 |

The cyan pigment dispersion CYAN1 had an average particle size of 124 nm.

Preparation of Pigment Dispersion CYAN2

The pigment dispersion CYAN2 was made in the same way as the dispersion CYAN1, except that the components according to Table 5 were used.

TABLE 5

| Component | wt % |
|---|---|
| PB15:4 | 15.0 |
| E7701 | 15.0 |
| STABI-2 | 1.0 |
| DPGDA | 69.0 |

The cyan pigment dispersion CYAN2 had an average particle size of 119 nm.

Preparation of Liquid UV Curable Inkjet Inks

The liquid UV curable inkjet inks C-1 to C-8 and I-1 to I-4 were prepared by mixing the ink components according to Table 6 and Table 7. The weight percentages (wt %) are based on the total weight of the liquid UV curable inkjet ink. The viscosity of each inkjet ink was measured for the conditions shown in the tables.

TABLE 6

| wt % of: | C-1 | C-2 | C-3 | C-4 | C-5 | C-6 | C-7 | C-8 |
|---|---|---|---|---|---|---|---|---|
| DPGDA | — | 19.50 | 39.35 | 59.20 | 70.00 | — | 35.40 | 0.75 |
| PEA | 65.10 | 45.60 | 25.75 | 5.90 | — | 18.80 | — | — |
| STABI-1 | 0.80 | 0.80 | 0.80 | 0.80 | — | 0.40 | — | — |
| STABI-2 | — | — | — | — | 0.90 | — | 0.50 | 0.15 |
| GAB | 5.00 | 5.00 | 5.00 | 5.00 | 5.00 | 5.00 | 5.00 | 5.00 |
| TPO-L | 6.00 | 6.00 | 6.00 | 6.00 | 6.00 | 6.00 | 6.00 | 6.00 |
| BAPO | 3.00 | 3.00 | 3.00 | 3.00 | 3.00 | 3.00 | 3.00 | 3.00 |
| C7500 | 0.10 | 0.10 | 0.10 | 0.10 | 0.10 | 0.10 | 0.10 | 0.10 |
| CYAN1 | 20.00 | 20.00 | 20.00 | 20.00 | — | 66.70 | — | — |
| CYAN2 | — | — | — | — | 15.00 | — | 50.00 | 85.00 |
| Polymerizable composition | | | | | | | | |
| wt % on ink | 79.1 | 79.1 | 79.1 | 79.1 | 80.0 | 65.5 | 68.7 | 58.0 |
| % DPGDA | — | 25.0 | 50.0 | 75.0 | 100.0 | — | 100.0 | 100.0 |
| % PEA | 100.0 | 75.0 | 50.0 | 25.0 | — | 100.0 | — | — |
| Viscosity (mPa · s) | | | | | | | | |
| 25° C. 1,000 s$^{-1}$ | 24.1 | 23.5 | 23.5 | 22.6 | 18.0 | 96.3 | 49.5 | — |
| 45° C. 1,000 s$^{-1}$ | 11.0 | 10.7 | 10.7 | 10.9 | 9.3 | 39.2 | 23.5 | — |
| 25° C. 10 s$^{-1}$ | — | — | — | — | — | 98.0 | 90.3 | 200.1 |
| 45° C. 10 s$^{-1}$ | — | — | — | — | — | 40.5 | 27.5 | 88.2 |

TABLE 7

| wt % of: | I-1 | I-2 | I-3 | I-4 |
|---|---|---|---|---|
| DPGDA | 17.10 | 1.00 | 18.20 | 4.55 |
| PEA | 1.70 | 34.40 | 17.20 | 16.00 |
| STABI-1 | 0.40 | — | — | — |
| STABI-2 | — | 0.50 | 0.50 | 0.35 |
| GAB | 5.00 | 5.00 | 5.00 | 5.00 |
| TPO-L | 6.00 | 6.00 | 6.00 | 6.00 |
| BAPO | 3.00 | 3.00 | 3.00 | 3.00 |
| C7500 | 0.10 | 0.10 | 0.10 | 0.10 |
| CYAN1 | 66.70 | — | — | — |
| CYAN2 | — | 50.00 | 50.00 | 65.00 |
| Polymerizable composition | | | | |
| wt % on ink | 65.5 | 68.7 | 68.7 | 64.0 |
| % DPGDA | 25.0 | 50.0 | 75.0 | 75.0 |
| % PEA | 75.0 | 50.0 | 25.0 | 25.0 |
| Viscosity (mPa · s) | | | | |
| 25° C. 1,000 s$^{-1}$ | 91.5 | 58.2 | 82.6 | — |
| 45° C. 1,000 s$^{-1}$ | 30.8 | 24.1 | 24.4 | — |
| 25° C. 10 s$^{-1}$ | 66.2 | 51.0 | 43.7 | 127.2 |
| 45° C. 10 s$^{-1}$ | 24.9 | 24.8 | 24.4 | 43.7 |

Evaluation and Results

The scratch resistance, flexibility and curing speed were determined according to the above described test methods using coatings made by a bar coater. When printing inkjet inks having a higher pigment concentration, the ink laydown can be reduced for obtaining the same optical density. So for a fair comparison, ink layers from a more concentrated inkjet ink should be coated at a thinner layer thickness than a less concentrated inkjet ink. The thickness of a layer coated by a bar coater at room temperature is mainly influenced by viscosity and the type of bar used in the bar coater. The best results for fair comparison were obtained according to Table 8.

TABLE 8

| Ink coating | Bar coater | Optical Density |
|---|---|---|
| C-1 | 20 μm wired bar | 2.2 |
| C-2 | 20 μm wired bar | 2.3 |
| C-3 | 20 μm wired bar | 2.4 |
| C-4 | 20 μm wired bar | 2.4 |
| C-5 | 20 μm wired bar | 2.4 |
| C-6 | 4 μm wired bar | 2.1 |
| C-7 | 4 μm wired bar | 2.1 |
| C-8 | polished bar | 2.1 |
| I-1 | 4 μm wired bar | 2.3 |

TABLE 8-continued

| Ink coating | Bar coater | Optical Density |
|---|---|---|
| I-2 | 4 μm wired bar | 2.3 |
| I-3 | 4 μm wired bar | 2.3 |
| I-4 | polished bar | 1.7 |

The results for scratch resistance, flexibility and curing speed are shown by Table 9.

TABLE 9

| Ink | wt % Pigment | Polyfunctional polymerizable compound | Scratch resistance | Flexibility | Curing speed |
|---|---|---|---|---|---|
| C-1 | 3.0 | 0.0 wt % | – – | >150 | 60 |
| C-2 | 3.0 | 25.0 wt % | – | 68 | 50 |
| C-3 | 3.0 | 50.0 wt % | ++ | 37 | 55 |
| C-4 | 3.0 | 75.0 wt % | ++ | 25 | 55 |
| C-5 | 3.0 | 100.0 wt % | ++ | 12 | 65 |
| C-6 | 10.0 | 0.0 wt % | – – | >150 | 70 |
| C-7 | 10.0 | 100.0 wt % | +++ | 34 | 80 |
| C-8 | 17.0 | 100.0 wt % | ++ | >150 | 100 |
| I-1 | 10.0 | 25.0 wt % | ++ | 136 | 80 |
| I-2 | 10.0 | 50.0 wt % | ++ | 60 | 80 |
| I-3 | 10.0 | 75.0 wt % | ++ | 54 | 75 |
| I-4 | 13.0 | 75.0 wt % | ++ | >150 | 95 |

From Table 9, it should be clear that surprisingly an improved compromise on scratch resistance and flexibility is found with the inventive inkjet inks I-1 to I-4. An inkjet ink containing only monofunctional or otherwise only polyfunctional polymerizable compounds fails on scratch resistance respectively flexibility.

A disadvantage is that the curing speed apparently decreases somewhat, so the pigment concentration is preferably limited to 13.0 wt % to minimize this effect. It is not clear why the curing speed decreases even though in comparison a slightly higher amount of photoinitiators is present for a smaller polymerizable composition in the inkjet ink. One hypothesis is that the thinner ink layers are more susceptible to oxygen inhibition of the free radical polymerization upon UV curing.

Example 2

This example illustrates the effect of pigment concentration and jetting viscosity on reliability of the inkjet printing process, more particularly on the tail length and number of satellites of ejected ink droplets.

Preparation of Liquid UV Curable Inkjet Inks

The liquid UV curable inkjet inks Ink-1 to Ink-5 were prepared by mixing the components according to Table 10 using a cyan pigment dispersion of PB15:4 in VEEA or DPGDA with DB162 or S35000 as polymeric dispersant. The pigment dispersions were made in the same manner as described above for the pigment dispersion CYAN1. By selecting different type and amount of monomers and polymeric dispersant and monomers, different viscosities above 16 mPa·s at 45° C. were realized for the inkjet inks.

TABLE 10

| wt % of component | Ink-1 | Ink-2 | Ink-3 | Ink-4 | Ink-5 |
|---|---|---|---|---|---|
| PB15:4 | 2.50 | 2.50 | 5.00 | 8.50 | 8.60 |
| DB162 | 2.50 | 2.50 | — | — | 8.60 |
| S35000 | — | — | 2.50 | 8.50 | — |
| VEEA | 11.48 | 11.48 | — | — | 43.45 |
| DPGDA | — | 13.55 | 23.46 | 35.61 | 24.00 |
| MPDA | 10.00 | — | 9.50 | 9.50 | — |
| (EO) 3TMPTA | 42.42 | 9.50 | 34.35 | 12.48 | — |
| Tegorad™ 2100 | — | 15.00 | — | — | — |
| CN3755 | — | — | 9.52 | 9.52 | — |
| TPO-L | — | — | 4.76 | 4.76 | 6.00 |
| EBLEO10101 | 30.00 | 25.00 | — | — | — |
| GAB | — | — | 5.56 | 5.56 | 5.00 |
| AXANTH | — | 20.00 | — | — | — |
| BAPO | — | — | 2.38 | 2.38 | 3.00 |
| STABI-1 | 1.00 | 0.17 | 0.96 | 1.18 | 1.25 |
| STABI-3 | — | 0.20 | — | — | — |
| C7500 | 0.10 | 0.10 | 2.00 | 2.00 | 0.10 |

Evaluation and Results

Different jetting temperatures were used so that at least two different viscosities were obtained with the same inkjet ink. The viscosity was measured at a shear rate of 10 s$^{-1}$ and a temperature indicated by Table 11.

The jetting was performed using a through-flow piezoelectric DOD print head CF1ou from TOSHIBA TEC. The jetting voltage was adapted so that the satellite analysis was performed at the same drop velocity of 6 m/s for all inkjet inks.

The tail length and number of satellites were determined using a drop-in-flight analysis tool JetXpert™ from ImageXpert for a large number of ejected ink droplets. An average was calculated and rounded to the nearest integer. The results are shown in Table 11 and FIG. 4.

TABLE 11

| Inkjet ink | Pigment Concentration | Temp. (° C.) | Viscosity (mPa · s) | Jetting Voltage (V) | Tail length (μm) | Number of satellites |
|---|---|---|---|---|---|---|
| Ink-1 | 2.5 | 49 | 26 | 22 | 461 | 5 |
| Ink-1 | 2.5 | 42 | 34 | 25 | 516 | 6 |
| Ink-2 | 2.5 | 49 | 34 | 23 | 568 | 5 |
| Ink-2 | 2.5 | 46 | 37 | 25 | 593 | 7 |
| Ink-2 | 2.5 | 41 | 45 | 29 | 691 | 8 |
| Ink-3 | 5.0 | 47 | 37 | 22 | 467 | 4 |
| Ink-3 | 5.0 | 38 | 51 | 27 | 510 | 4 |
| Ink-4 | 8.5 | 51 | 55 | 27 | 530 | 3 |
| Ink-4 | 8.5 | 47 | 62 | 29 | 548 | 2 |
| Ink-5 | 8.6 | 49 | 28 | 20 | 392 | 4 |
| Ink-5 | 8.6 | 31 | 51 | 29 | 508 | 3 |

From Table 11, it can been seen that inkjet inks Ink-1 and Ink-2 containing a state-of-the-art amount (2.5 wt %) of organic colour pigment exhibit also at a higher jetting viscosity above 16.0 mPa·s a large number of satellites. By comparing the UV curable inkjet inks Ink-1, Ink-2 and Ink-5 having a comparable jetting viscosity at 49° C., it should be clear that the increased pigment concentration results in fewer satellites and thus better image quality. The results have been visualized in FIG. 4. At a pigment concentration of 5 wt % in the inkjet ink, no change in the number of satellites is observed. It is submitted that from a concentration of 6.0 wt % of organic colour pigment in the inkjet ink, a clear reduction in number of satellites can be observed with increasing jetting viscosity. The preferred range for jetting viscosity is between 45° C. and 65° C. Below 45° C. the number of satellites remains somewhat higher, while above 65° C. the reliability of the inkjet printing process is reduced as undesired free radical polymerization of the inkjet ink can sometimes be observed at higher temperatures.

Example 3

This example illustrates a UV curable CMYKW inkjet ink set.

Preparation of Pigment Dispersions

Pigment Dispersion for Ink Y

The pigment dispersion was made by mixing the components according to Table 12 for 30 minutes using a DISPERLUX™ disperser from DISPERLUX S.A.R.L., Luxembourg. The dispersions were then milled using a Bachofen DYNOMILL ECM mill filled with 0.4 mm yttrium stabilized zirconia beads ("high wear resistant zirconia grinding media" from TOSOH Co.). The mixtures were circulated over the mill for 2 hours. After milling, the pigment dispersions were discharged over a 1 μm filter into a vessel.

TABLE 12

| Component | wt % |
|---|---|
| PY150 | 18.0 |
| E7701 | 12.0 |
| STABI-1 | 1.0 |
| DPGDA | 69.0 |

Pigment Dispersion for Ink M

The pigment dispersion was prepared in the same manner as for Ink Y, except that the components according to Table 13 were used.

TABLE 13

| Component | wt % |
|---|---|
| PV19 | 15.0 |
| E7701 | 10.0 |
| STABI-1 | 1.0 |
| VEEA | 25.0 |
| DPGDA | 49.0 |

Pigment Dispersion for Ink C

The pigment dispersion was prepared in the same manner as for Ink Y, except that the components according to Table 14 were used.

TABLE 14

| Component | wt % |
|---|---|
| PB15:4 | 15.0 |
| E7701 | 10.0 |
| STABI-1 | 1.0 |
| VEEA | 37.5 |
| DPGDA | 36.5 |

Pigment Dispersion for Ink K

The pigment dispersion was prepared in the same manner as for Ink Y, except that the components according to Table 15 were used.

TABLE 15

| Component | wt % |
|---|---|
| SB550 | 9.1 |
| PB15:4 | 4.2 |

TABLE 15-continued

| Component | wt % |
|---|---|
| PR57 | 1.7 |
| E7701 | 7.5 |
| STABI-1 | 1.0 |
| VEEA | 29.0 |
| DPGDA | 47.5 |

Pigment Dispersion for Ink W

The pigment dispersion was prepared in the same manner as for Ink Y, except that the components according to Table 16 were used.

TABLE 16

| Component | wt % |
|---|---|
| TIO2 | 50.0 |
| DB162 | 4.0 |
| STABI-2 | 1.0 |
| VEEA | 46.0 |

Preparation of Liquid UV Curable Inkjet Inks

The UV curable CMYKW inkjet ink set was prepared by mixing the components for each liquid UV curable inkjet ink according to Table 17 using the above prepared pigment dispersions.

TABLE 17

| wt % of component | Ink Y | Ink M | Ink C | Ink K | Ink W |
|---|---|---|---|---|---|
| PY150 | 8.55 | — | — | — | — |
| PB15:4 | — | — | 8.57 | 2.08 | — |
| PV19 | — | 8.57 | — | — | — |
| PR57 | — | — | — | 0.86 | — |
| SB550 | — | — | — | 4.56 | — |
| TIO2 | — | — | — | — | 26.10 |
| E7701 | 5.70 | 5.71 | 5.71 | 3.75 | — |
| D162 | — | — | — | — | 2.10 |
| DPGDA | 33.78 | 29.00 | 20.86 | 34.92 | 24.00 |
| VEEA | 27.75 | 32.50 | 36.64 | 23.75 | 23.60 |
| CN3755 | 9.52 | 9.52 | 9.52 | 9.52 | — |
| C704 | — | — | — | — | 9.00 |
| TPO-L | 4.76 | 4.76 | 4.76 | 6.00 | 6.00 |
| GAB | 5.56 | 5.56 | 5.56 | 5.56 | 5.00 |
| BAPO | 2.38 | 2.38 | 2.38 | 3.00 | 3.00 |
| DETX | — | — | 4.00 | 4.00 | — |
| UV3510 | 1.00 | 1.00 | 1.00 | 1.00 | — |
| C7500 | — | — | — | — | 0.10 |
| STABI-1 | 1.00 | 1.00 | 1.00 | 1.00 | 1.10 |

Evaluation and Results

The dynamic viscosity was determined for each liquid UV curable inkjet ink at 25, 35 and 45° C. The results are shown by Table 18.

TABLE 18

| | Dynamic Viscosity @shear rate 1000 s$^{-1}$ (mPa · s) | | | | |
|---|---|---|---|---|---|
| Temperature | Ink Y | Ink M | Ink C | Ink K | Ink W |
| 25° C. | 52.9 | 54.0 | 49.3 | 44.5 | 45.8 |
| 35° C. | 35.5 | 35.6 | 33.5 | 29.5 | 29.9 |
| 45° C. | 25.6 | 26.0 | 23.7 | 20.6 | 20.7 |

The average particle size was determined after 1 week at 60° C. From the results in Table 19, it can be seen that the particle size of the organic pigments remains less than 150 nm. The particle size of the white inkjet ink is higher than 200 nm, thereby guaranteeing good opacity.

TABLE 19

| Inkjet Ink | Average Particle Size |
|---|---|
| Ink Y | 144 nm |
| Ink M | 140 nm |
| Ink C | 116 nm |
| Ink K | 140 nm |
| Ink W | 235 nm |

Multi-colour images of good quality were printed with the UV curable CMYKW inkjet ink set on a plasma-treated polypropylene substrate using a custom built inkjet printer employing through-flow piezoelectric DOD print heads CF1ou from TOSHIBA TEC at a drop velocity of 6 m/s.

REFERENCE SIGNS LIST

TABLE 20

| | |
|---|---|
| 1 | Print head |
| 2 | Ejected droplet |
| 3 | Ink-receiver |
| 4 | Tail |
| 5 | Main droplet |
| 6 | Fast satellite |
| 7 | Slow satellite |
| 8 | Ink dot |
| 9 | Secondary ink dot |

The invention claimed is:

1. A liquid UV curable inkjet ink comprising:
one or more photoinitiators in an amount of at least 7.0 wt % relative to a total weight of the liquid UV curable inkjet ink;
an organic color pigment; and
a polymerizable composition in an amount less than 75 wt % relative to the total weight of the liquid UV curable inkjet ink and including at least one monofunctional polymerizable compound and at least one polyfunctional polymerizable compound; wherein
the organic color pigment is present in an amount of 6.0 to 13.0 wt % based on the total weight of the liquid UV curable inkjet ink;
the at least one polyfunctional polymerizable compound is present in an amount of 20.0 wt % to 50.0 wt % based on a total weight of the polymerizable composition;
the liquid UV curable inkjet ink has a viscosity at 45° C. and a shear rate of 10 $s^{-1}$ of at least 16.0 mPa.s; and
the liquid UV curable inkjet ink has a viscosity at 25° C. and a shear rate of 10 $s^{-1}$ of at least 40.0 mPa.s.

2. The liquid UV curable inkjet ink according to claim 1, wherein the at least one polyfunctional polymerizable compound is present in an amount of 25.0 to 50.0 wt % based on the total weight of the polymerizable composition.

3. The liquid UV curable inkjet ink according to claim 1, wherein at least one of the one or more photoinitiators is selected from the group consisting of a polymeric photoinitiator, a polymerizable photoinitiator, and a photoinitiator including a plurality of photoinitiating groups.

4. The liquid UV curable inkjet ink according to claim 1, wherein the polymerizable composition is present in amount less than 70.0 wt % based on the total weight of the liquid UV curable inkjet ink.

5. The liquid UV curable inkjet ink according to claim 1, further comprising 0 to 10 wt % of an organic solvent based on the total weight of the liquid UV curable inkjet ink.

6. The liquid UV curable inkjet ink according to claim 1, wherein the viscosity is from 20.0 to 65.0 mPa.s at 45° C. and a shear rate of 10 $s^{-1}$.

7. The liquid UV curable inkjet ink according to claim 1, wherein the one or more photoinitiators includes an acylphosphine oxide photoinitiator and a thioxanthone photoinitiator.

8. A UV curable inkjet ink set for printing different colors comprising:
at least one liquid UV curable inkjet ink according to claim 1.

9. The UV curable inkjet ink set according to claim 8, wherein
the UV curable inkjet ink set includes at least three liquid UV curable color inkjet inks, each including one or more different organic color pigments present in an amount of 6.0 to 13.0 wt % based on the total weight of the liquid UV curable color inkjet ink.

10. The UV curable inkjet ink set according to claim 8, further comprising:
a liquid UV curable white inkjet ink including a titanium dioxide pigment having an average particle size larger than 180 nm.

11. The UV curable inkjet ink set according to claim 8, further comprising:
a liquid UV curable black ink including a carbon black pigment and a β-copper phthalocyanine pigment having an average particle size smaller than 200 nm.

12. A UV curable inkjet printing method comprising the steps of:
jetting at least one liquid UV curable inkjet ink according to claim 1 onto a substrate with a print head at a jetting temperature of 45° C. or more; and
UV curing the at least one liquid UV curable inkjet ink jetted on the substrate.

13. The UV curable inkjet printing method according to claim 12, wherein the substrate is pre-treated by a corona, a plasma, or a flame treatment.

14. The UV curable inkjet printing method according to claim 12, wherein the print head is a through-flow piezoelectric drop-on-demand print head.

15. The UV curable inkjet printing method according to claim 12, wherein the at least one liquid UV curable inkjet ink is jetted at a temperature between 45° C. and 65° C.

* * * * *